US010938891B2

(12) United States Patent
Dasgupta et al.

(10) Patent No.: US 10,938,891 B2
(45) Date of Patent: Mar. 2, 2021

(54) REDUCING CLOUD APPLICATION EXECUTION LATENCY

(71) Applicant: International Business Machines Corporation, Armonk, NY (US)

(72) Inventors: Abhishek Dasgupta, Kolkata (IN); Nitesh Konkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 16/280,096

(22) Filed: Feb. 20, 2019

(65) Prior Publication Data
US 2020/0264926 A1  Aug. 20, 2020

(51) Int. Cl.
*G06F 9/46* (2006.01)
*H04L 29/08* (2006.01)
*G06F 9/50* (2006.01)
*G06F 9/54* (2006.01)
*G06F 13/00* (2006.01)
*G06F 11/20* (2006.01)
*G06F 11/14* (2006.01)

(52) U.S. Cl.
CPC ......... *H04L 67/1008* (2013.01); *G06F 9/505* (2013.01); *G06F 9/542* (2013.01); *H04L 67/10* (2013.01); *H04L 67/34* (2013.01); *G06F 9/5027* (2013.01); *G06F 11/1438* (2013.01); *G06F 11/203* (2013.01); *G06F 13/00* (2013.01)

(58) Field of Classification Search
CPC .. G06F 11/1438; G06F 9/5072; G06F 11/203; G06F 9/5016; G06F 9/5088; G06F 9/5027; G06F 2009/504; H04L 43/16; H04L 67/1008; H04L 67/10
See application file for complete search history.

(56) References Cited

U.S. PATENT DOCUMENTS

| 9,424,065 | B2 | 8/2016 | Singh et al. | |
| 10,673,779 | B1* | 6/2020 | Mehr | ...................... H04L 43/16 |
| 2006/0143350 | A1* | 6/2006 | Miloushev | ............ G06F 9/5016 710/242 |
| 2006/0150010 | A1* | 7/2006 | Stiffler | ................ G06F 11/1438 714/13 |
| 2006/0218285 | A1* | 9/2006 | Talwar | .................. G06F 9/5072 709/227 |
| 2007/0277056 | A1* | 11/2007 | Varadarajan | ........ G06F 11/1438 714/15 |

(Continued)

OTHER PUBLICATIONS

"CRIU", 3 pages, retrieved from the Internet on Jan. 17, 2019, <https://criu.org/Main_Page>.

(Continued)

*Primary Examiner* — Tuan A Vu
(74) *Attorney, Agent, or Firm* — David K. Mattheis; William H. Hartwell; Nicholas L. Cadmus

(57) ABSTRACT

Improving execution for a served application by identifying a network resource having a partial portion of the application's necessary computing resource requirements, deploying the served application to the network resource, monitoring the execution of the application and storing a checkpoint state of the served application prior to exhausting the resources. Further, by identifying a network resource having a greater portion of the computing resources; and deploying the checkpoint state of the served application to that network resource.

20 Claims, 4 Drawing Sheets

(56) References Cited

U.S. PATENT DOCUMENTS

2018/0219794 A1 8/2018 Patil et al.
2018/0267835 A1 9/2018 Allen et al.

OTHER PUBLICATIONS

"Linux Extended BPF (eBPF) Tracing Tools", Created Dec. 28, 2016, Last Updated Dec. 27, 2018, 26 pages, <http://www.brendangregg.com/ebpf.html>.
"Production-Grade Container Orchestration", Kubernetes, retrieved from the Internet on Jan. 17, 2019, 7 pages, <kubernetes.io>.
"Regional Clusters", Kubernetes Engine, Google Cloud, 5 pages, last updated Jan. 11, 2019, <https://cloud.google.com/kubernetes-engine/docs/concepts/regional-clusters>.
Mell et al., "The NIST Definition of Cloud Computing", Recommendations of the National Institute of Standards and Technology, Special Publication 800-145, Sep. 2011, 7 pages.

\* cited by examiner

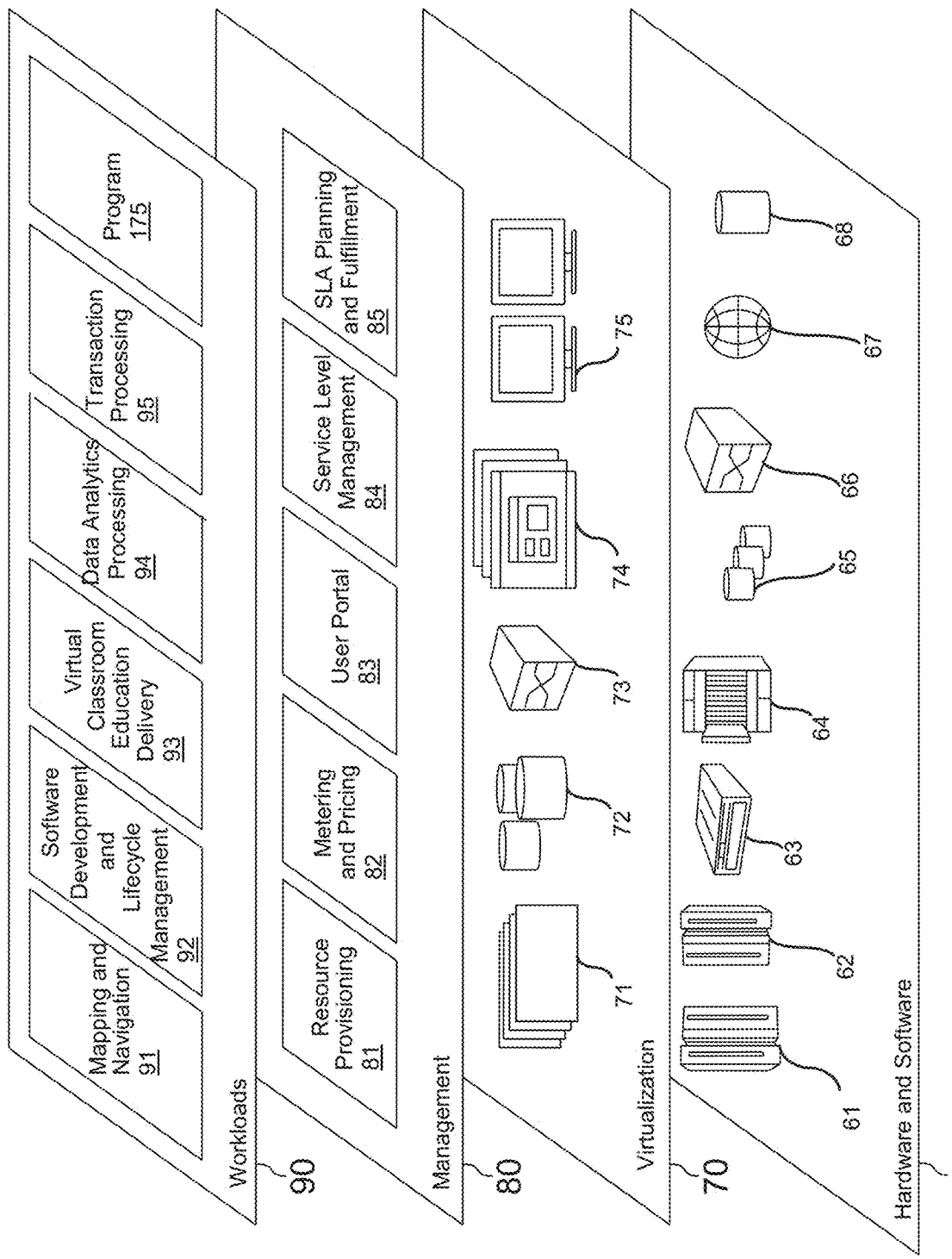

REDUCING CLOUD APPLICATION EXECUTION LATENCY

BACKGROUND

The disclosure relates generally to managing cloud resources for application execution. The disclosure relates particularly to reducing cloud application execution latency by managing cloud resource utilization with multi-stage processing of the application's instructions.

A collection of computational servers is known as a cluster. Typically, a central server acts as a primary and the other servers of the cluster act as secondaries to the primary. Application deployment requests are sent from a user to the primary and are then deployed to the slaves by the primary. Deployment decisions by the primary are based upon the resource availability of the slaves.

A federated cluster is a collection of clusters distributed across different geographic regions. A multi-zone cluster is a cluster comprising a collection of nodes distributed across different geographic regions. Each of the federated and multi-zone clusters affords an opportunity to better serve users by utilizing servers which are geographically closest to the user to execute the application deployment requests. Using the closest servers may reduce the overall latency required to execute the application.

SUMMARY

Aspects of the invention disclose methods, systems and computer readable media associated with improving the execution of networked applications by reducing application latency. In one aspect execution may be improved by identifying a network resource having a partial portion of the computing resource requirements, deploying the served application to the network resource, monitoring execution of the application and storing a checkpoint state of the served application prior to exhausting the resources. Further, by identifying a network resource having computing resources greater than the partial portion of computing resources and deploying the checkpoint state of the served application to that network resource.

BRIEF DESCRIPTION OF THE DRAWINGS

FIG. 4 depicts abstraction model layers, according to an embodiment of the invention.

DETAILED DESCRIPTION

Figure 1:
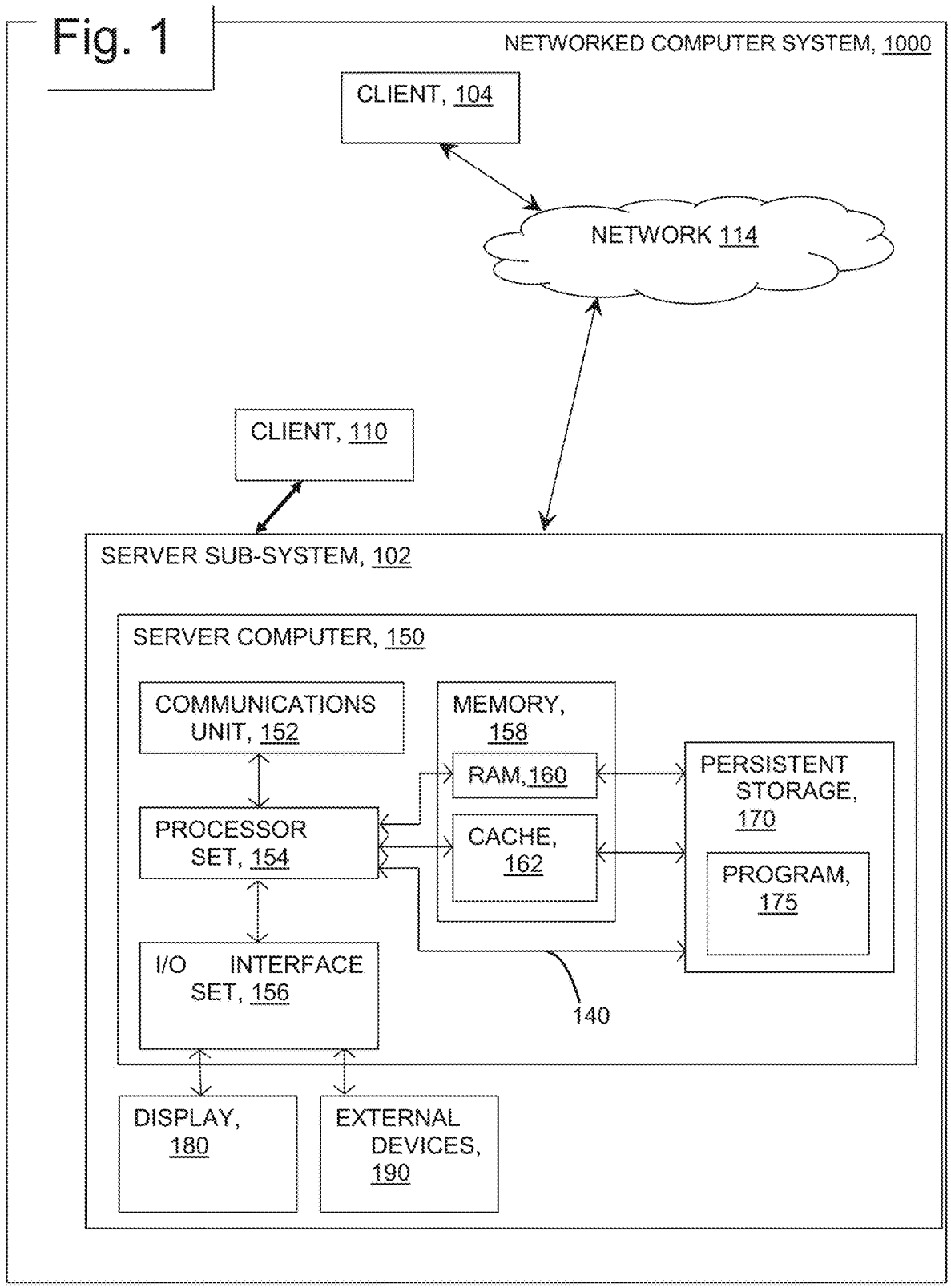
FIG. 1 provides a schematic illustration of a system, according to an embodiment of the invention.

The latency associated with the execution of a networked application, such as an application utilizing cloud-based resources, may be adversely affected by the availability of those resources. As an example, an application request requiring, N GB of RAM must wait until a cloud resource having N GB becomes available. All intervening time between a request for deployment of the application and the availability of the resource adds to the overall latency associated with the execution of the application. Methods and systems utilizing cloud resources having less than a full complement of necessary computing resources provide for a reduction in such latency and faster turn-around execution time for clients, as well as more completely utilizing system resources by reducing resource idle time.

The disclosed inventions may be applied to all network deployed applications. The inventions may be particularly beneficially applied to networked applications having extended application execution times.

In an embodiment, a computer implemented method for managing application execution to increase resource utilization and reduce application latency includes: receiving a deployment request for an application hosted on a networked computer system. In an embodiment, the request may comprise information relating to computing resources (RAM, central processing unit (CPU) and graphics processing unit (GPU) capacity) necessary for completing the application execution. In an embodiment, the necessary resources associated with hosted applications may be stored in a database and accessed as deployment requests for the application are received.

The application's resource needs are determined by the method utilizing information provided in the request or by accessing a database. In an embodiment, a primary server acts upon the deployment request together with the computing requirements specification by identifying a networked resource capable of starting the execution of the application. In an embodiment, networked resources are examined to determine the availability of a resource capable in terms of computing resources, of carrying the execution of the application through to completion. Deployment may be passed to such resources and execution completes with the user being notified of completion and any application output being passed to the user.

In an embodiment where no such resources are available, the method proceeds to examine available resources in terms of the capacity to start and partially complete execution of the application. Resources are considered in terms of the extent to which their resources provide for completion of the application. In an embodiment, the primary will deploy the application to the resource most capable of completing the execution. As an example, a deployment request is received for an application requiring 5 GB of RAM. A review of a set of four currently available resources indicates RAM availability for the resource members of the set of 1 GB, 2 GB, 3 GB and 4 GB. In this embodiment, RAM is considered a scarce resource, the primary considers the RAM available for each of the members of the set. The primary deploys the execution to the resource having the greatest availability of the scarce resource among members of the set (4 GB of available RAM, or 80% of the necessary RAM). In an embodiment, CPU and GPU resources may also be used as criteria in determining where to deploy the execution.

In an embodiment, as execution proceeds, the use of the scarce resource by the application is monitored. In an embodiment, a stand-alone monitoring side-car code tracks scarce resource use accompanying each operation by the application which consumes the scarce resource. In an embodiment, the monitoring may be accomplished by monitoring code within the application itself. Monitoring the consumption of the scarce resource by the application provides an indication of when the execution of the application will be halted to a scarcity of resources—i.e., an out of memory error, or other error associated with a lack of the scarce resource. Ongoing monitoring of the resource enables the current state of the execution to be checkpointed as resource consumption mounts. After a determination that resource consumption will lead to a halt in execution, the method writes the checkpointed state of execution prior to the execution halt to memory.

In an embodiment, a Check Max Roll algorithm may be used to monitor execution of the application. The Check Max Roll algorithm analyzes execution of the application on networked resources over time. The algorithm tracks the usage of RAM, CPU, GPU and other resources. In an embodiment, the algorithm tracks resource usage on a per millisecond basis during execution. Usage tracking may be monitored for a single complete execution of the application, or the usage across multiple executions may be tracked and aggregated to an average usage per millisecond.

The tracked resource usage data is then rolled to develop a trend for resource usage. Each rolling of the data advances the data by one step, one millisecond in the example. The data may be rolled any number of times selected by a user. In an embodiment, the data is rolled three times. Rolling the data generates a new data set from an original tracking of usage. The original set is rolled ahead in time by one unit. In an embodiment, the first data entry is discarded, and the second entry is rolled forward becoming the first entry in the second data set. For the third data set, the first entry of the second data set is discarded and the other entries of that set are rolled forward one step. After the data has been rolled, a maximum value for each step (each millisecond) is determined by selecting the maximum value of the entries for the particular step. The generated series of per step maxima represents the trend of maximum resource utilization by the application on a per time step basis.

Table 1 provides an example of the Check Max Roll algorithm in use. Column 1 indicates the sequential time interval. Column 2 includes the original CPU usage data. Column 2 is the column 1 data rolled by one time interval increment. Column 3 is column 2 data rolled by one increment. Column 4 is the maximum value of CPU usage for the sequential time interval taken across the three previous columns. The value of Column 4 is used by the algorithm as the application is executed to determine when to checkpoint the application.

TABLE 1

Check Max Roll data for CPU usage

| Unit of Time | CPU Usage1 | CPU Usage2 | CPU Usage3 | Maximum CPU Usage |
|---|---|---|---|---|
| 1 | 0.47 | 0.51 | 0.51 | 0.51 |
| 2 | 0.51 | 0.51 | 0.54 | 0.54 |
| 3 | 0.51 | 0.54 | 0.53 | 0.54 |
| 4 | 0.54 | 0.53 | 0.53 | 0.54 |
| 5 | 0.53 | 0.53 | 0.25 | 0.53 |
| 6 | 0.53 | 0.25 | 0.41 | 0.53 |
| 7 | 0.25 | 0.41 | 0.34 | 0.41 |
| 8 | 0.41 | 0.34 | 0.45 | 0.45 |
| 9 | 0.34 | 0.45 | 0.68 | 0.68 |
| 10 | 0.45 | 0.68 | 0.39 | 0.68 |
| 11 | 0.68 | 0.39 | 0.46 | 0.68 |
| 12 | 0.39 | 0.46 | 0.36 | 0.46 |
| 13 | 0.46 | 0.36 | 0.41 | 0.46 |
| 14 | 0.36 | 0.41 | 0.24 | 0.41 |
| 15 | 0.41 | 0.24 | 0.5 | 0.5 |
| 16 | 0.24 | 0.5 | 0.23 | 0.5 |

The maxima data may then be used by the side-car application to determine when checkpoints of the application state should be written to memory. In an embodiment, an application deployed to a node having 4 GB of available RAM may have Check Max Roll analysis data indicating that the application will consume more than the available 4 GB of RAM at 12 minutes of execution. A checkpoint of the application state will then be written immediately prior to the 12-minute mark to preserve the execution at that point.

The checkpointed state may be written to persistent memory or to a hard drive memory. In an embodiment, the use of persistent memory may utilize fewer system resources and take less time that accessing a hard drive for storing the checkpointed state.

At this point, the application has been at least partially executed and the state when execution halted has been captured. The state of all networked resources has progressed during this execution. Execution of the application has not completed. In an embodiment, a special deployment request is created for the unexecuted portion of the application. The special request carries a resource requirement providing that deployment proceed only to a resource having more of the scarce resource than the previous resource, or more of the resource than the amount provided by the Check Max Roll analysis which triggered the checkpoint. In an embodiment, after executing the application to a point where 4 GB of RAM had been consumed, execution halts. A special deployment request is created providing that more than 4 GB of RAM must be available from the next identified resource. In an embodiment, after a checkpoint triggered due to a Check Max Roll CPU usage level of 68%, the next deployment will require a CPU availability of greater than 68%.

Resources are polled until a resource satisfying the requirements of the special deployment request becomes available. The execution is then passed to the new resource and the stored checkpoint state is written to the resource, where execution resumes at the point where it halted. This iteration of executing until a scarce resource is exhausted, writing a checkpointed state to memory, halting execution, creating a special deployment request associated with a requirement for additional scarce resources, continues until execution completes. In an embodiment, the method completes after complete execution of the application by notifying the user that the execution of the application has completed and by providing application output(s) to the user.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 may lack sufficient computing resources (processor, memory, network communications hardware) to execute desired programs. Such programs may be stored upon network resources. As shown in FIG. 1, server sub-system 102 comprises a server computer 150. Request for execution of desired programs may be sent from Client Devices 104 and 100 to the server computer 150, for execution.

FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, cache 162, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM). In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the resource management program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, 106, 108, 110, and 112. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., resource management program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
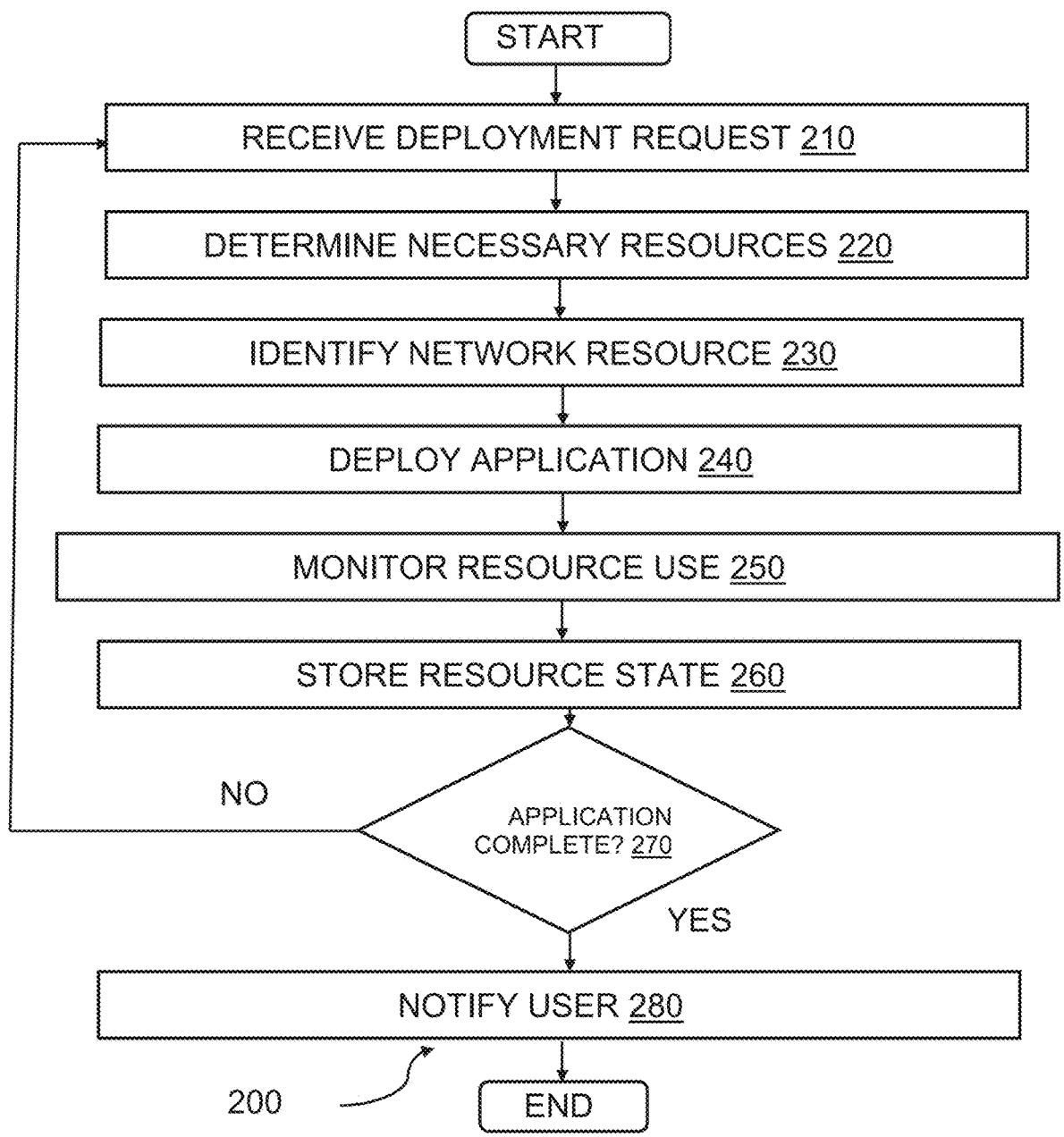
FIG. 2 provides a flowchart depicting an operational sequence, according to an embodiment of the invention.

FIG. 2 provides a flowchart 200, illustrating exemplary activities associated with the practice of the disclosure. After program start, an application deployment request is received at 210. In an embodiment, the application deployment request is received by a primary server and includes a description of the computational resources necessary for executing the application to completion. Examples include RAM, CPU, and GPU requirements.

The computational resources needed are identified at 220 either from the deployment request or from a database associating resource needs with registered applications. The primary server reviews the necessary resources in view of currently available networked resources at 230. If a resource completely satisfying the requirements is available, the primary deploys the application to that resource for completion. In situations where no resource is available which satisfies all necessary requirements, a resource is selected which most completely satisfies the requirements.

As an example, a resource having 100% of the necessary CPU and GPU resources but only 75% of the required RAM would be selected over a resource having 100% of the necessary CPU and GPU resources but only 50% of the required RAM. In this example, RAM would be considered a scarce resource as the identified network resource lacks sufficient RAM to complete execution of the application. The application is deployed to the identified resource at 240.

Execution of the application by the resource begins at 250. The execution is monitored by either internal application code written for this purpose, or by a stand-alone monitoring side-car code intended to facilitate the disclosed method. In an embodiment, the monitoring code tracks the usage of the scarce resource, noting the remaining amount of the resource after each operation of the application which consumes part of the resource, or predicting the amount which be remaining based upon pending operations. A checkpoint of the state of the application is made after each monitoring action is complete. After a determination by the monitoring code that the execution will be halted for want of resources, the last checkpoint of the application will be stored. The checkpointed state may be stored either to a hard disk or to persistent memory of the system at 260.

In an embodiment, the side-car application utilizes the Check Max Roll algorithm to determine when to checkpoint the application. In this embodiment, checkpoints are stored to persistent memory, or hard disk when no persistent memory is available, at points identified by analysis of previous deployments of the requested application. The checkpoints are determined according to observed average resource usage for the application and the amount of scarce resources available on the current node of the deployment.

As an example, an application A, is deployed to a node resource having only 60% CPU availability. Check Max Roll analysis of the application A in previous deployments indicates that the CPU usage for the application is 68% utilization occurs 8 milliseconds into application execution. According to the Check Max Roll analysis, the application will exceed available resource at 8 milliseconds of execution. The side-car application will write a checkpoint of the application to memory after 7 milliseconds and before 8 milliseconds. A special deployment request will then be created requiring a resource having more than 68% CPU availability. A check is made at 270 to determine if execution has completed. After completion, the user is notified at 280 and the results of the execution are provided. When execution has not yet completed, the process returns to step 210 with the creation of a new deployment request.

When the application does not complete, a special deployment request is created for the stored state. The special request includes requirements that the next resource for deployment include more of any scarce resource than the previous networked resource had. As an example, a deployment to a server having 3 GB of RAM of a required 5 GB leads to a checkpoint and storage when the application has consumed 3 GB of RAM. The special deployment request requires more than 3 GB of RAM such that the execution of the application will progress with the new deployment. Actions 210 through 270 are repeated until the application completes and the user is notified of the completion.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
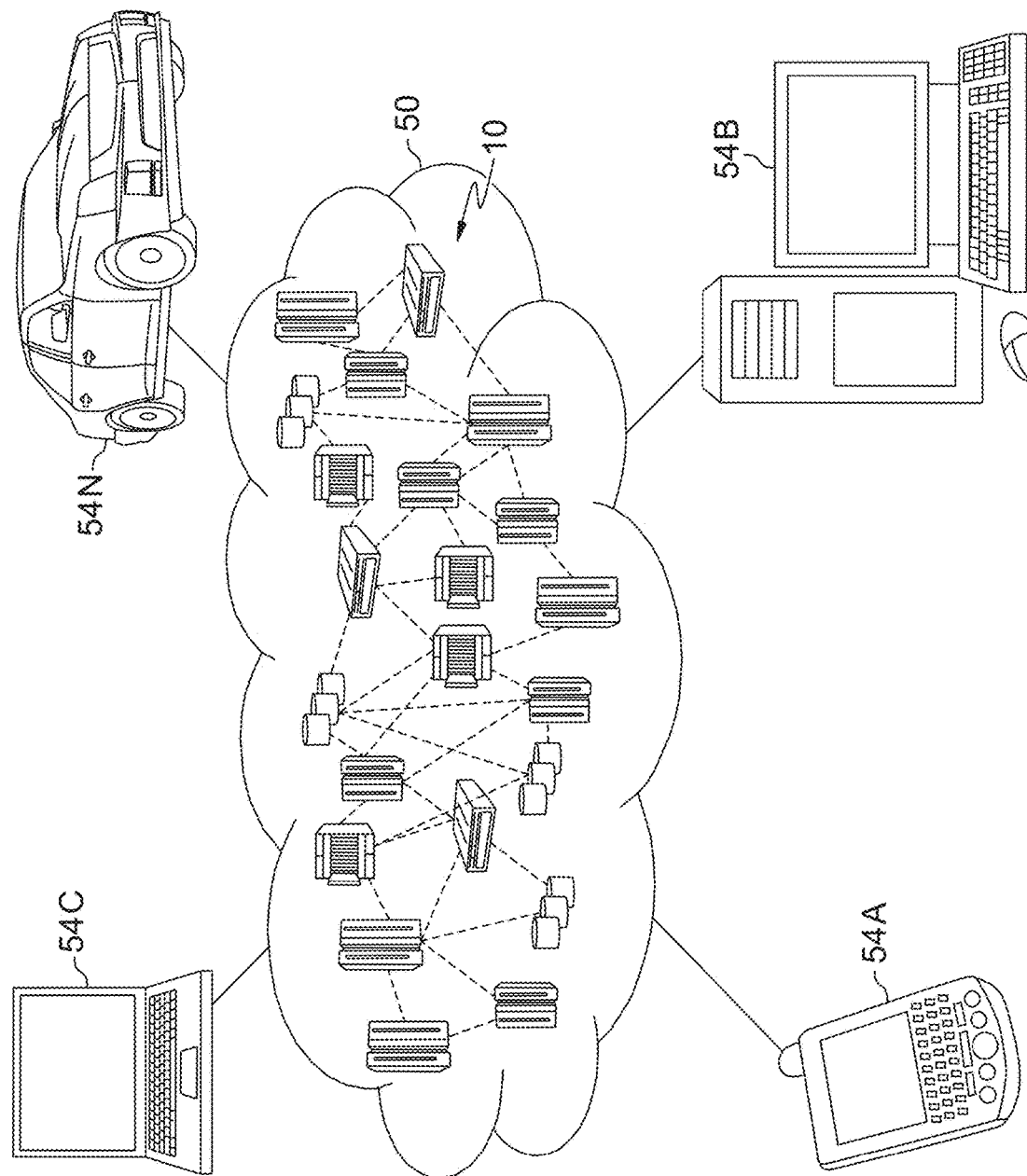
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource management program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing application execution, the method comprising:
receiving, by one or more computer processors, a served application deployment request;
determining, by one or more computer processors, computing resource requirements for the served application;
identifying, by one or more computer processors, a first network resource comprising a first partial portion of a computing resource requirement of a computing resource for the served application, wherein the first partial portion is less than the computing resource requirement;
deploying, by one or more computer processors, the served application to the first network resource;
monitoring, by one or more computer processors, utilization of the computing resource during execution of the served application;
making a determination of when execution of the served application will halt for want of the computing resource;
storing, by one or more computer processors, a checkpoint state of the served application from the first network resource according to the determination of when execution of the served application will halt for want of the computing resource and before the execution halts;
identifying, by one or more computer processors, a second network resource comprising more of the computing resource for the served application than the first partial portion of the computing resource; and
deploying, by one or more computer processors, the checkpoint state of the served application to the second network resource.

2. The computer implemented method according to claim 1, wherein storing a checkpoint state of the served application from the first network resource comprises storing, by one or more computer processors, the checkpoint state in persistent memory.

3. The computer implemented method according to claim 1, wherein determining computer resource requirements of the served application comprises determining, by one or more computer processors, a resource selected from the group consisting of: random access memory (RAM), central processor unit, graphics processor unit resources, and combinations thereof.

4. The computer implemented method according to claim 1, wherein identifying a first network resource comprising a first partial portion of a computing resource requirement, wherein the first partial portion is less than the computing resources requirement, comprises identifying, by one or more computer processors, a first network resource from a set of network resources, each network resource of the set comprising a partial portion of a necessary computing resource requirement less than the computing resource requirement, wherein the first network resource comprises a greatest partial portion of the computing resource requirement among members of the set.

5. The computer implemented method according to claim 1, wherein monitoring execution of the served application comprises monitoring execution according a check max roll analysis of the served application.

6. The computer implemented method according to claim 1, further comprising:
creating, by one or more computer processors, a deployment request for the checkpoint state, wherein the deployment request requires computing resources greater than the first partial portion of the computing resource.

7. The computer implemented method according to claim 1, further comprising:

completing, by one or more computer processors, the served application deployment request; and notifying, by one or more computer processors, a user of the served application deployment request completion.

8. A computer program product for managing application execution, the computer program product comprising one or more computer readable storage devices and stored program instructions on the one or more computer readable storage devices, the stored program instructions comprising:

programmed instructions for receiving a served application deployment request;

programmed instructions for determining computing resource requirements of a computing resource for the served application for the served application;

programmed instructions for identifying a first network resource comprising a first partial portion of a computing resource requirements, wherein the first partial portion is less than the computing resource requirement;

programmed instructions for deploying the served application to the first network resource;

programmed instructions for monitoring utilization of the computing resource during execution of the served application;

programmed instructions to make a determination of when execution of the served application will halt for want of the computing resource programmed instructions for storing a checkpoint state of the served application from the first network resource according to the determination of when execution of the served application will halt for want of the computing resource and before the execution halts;

programmed instructions for identifying a second network resource comprising more of the computing resource for the served application than the first partial portion of the computing resource; and programmed instructions for deploying the checkpoint state of the served application to the second network resource.

9. The computer program product according to claim 8, wherein storing a checkpoint state of the served application from the first network resource comprises programmed instructions for storing the checkpoint state in persistent memory.

10. The computer program product according to claim 8, wherein the programmed instructions for determining computer resource requirements of the served application comprises programmed instructions for determining a resource selected from the group consisting of: random access memory (RAM), central processor unit, graphics processor unit resources, and combinations thereof.

11. The computer program product according to claim 8, wherein the programmed instructions for identifying a first network resource comprising a first partial portion of the computing resource requirements wherein the first partial portion is less than the computing resource requirement comprises programmed instructions for identifying a first network resource from a set of network resources, each network resource of the set comprising a partial portion of a necessary computing resource requirement less than the computing resource requirement, wherein the first network resource comprises a greatest partial portion of the computing resource requirement among members of the set.

12. The computer program product according to claim 8, wherein monitoring execution of the served application comprises monitoring execution according a check max roll analysis of the served application.

13. The computer program product according to claim 8, wherein the stored program instructions further comprise:

programmed instructions for creating a deployment request for the checkpoint state, wherein the deployment request requires computing resources greater than the first partial portion of the computing resource.

14. The computer program product according to claim 8, wherein the stored program instructions further comprise:

programmed instructions for completing the served application deployment request; and programmed instructions for notifying a user of the served application deployment request completion.

15. A computer system for managing application execution, the computer system comprising:

one or more computer processors;

one or more computer readable storage devices;

stored program instructions on the one or more computer readable storage devices for execution by the at least on computer processor, the stored program instructions comprising:

programmed instructions for receiving a served application deployment request;

programmed instructions for determining computing resource requirements of a computing resource for the served application for the served application;

programmed instructions for identifying a first network resource comprising a first partial portion of a computing resource requirements, wherein the first partial portion is less than the computing resource requirement;

programmed instructions for deploying the served application to the first network resource;

programmed instructions for monitoring utilization of the computing resource during execution of the served application;

programmed instructions to make a determination of when execution of the served application will halt for want of the computing resource programmed instructions for storing a checkpoint state of the served application from the first network resource according to the determination of when execution of the served application will halt for want of the computing resource and before the execution halts;

programmed instructions for identifying a second network resource comprising more of the computing resource for the served application than the first partial portion of the computing resource; and programmed instructions for deploying the checkpoint state of the served application to the second network resource.

16. The computer system according to claim 15, wherein the programmed instructions for determining computer resource requirements of the served application comprise programmed instructions for determining a resource selected from the group consisting of: random access memory (RAM), central processor unit, graphics processor unit resources and combinations thereof.

17. The computer system according to claim 15, wherein the programmed instructions for identifying a first network resource comprising a first partial portion of the computing resource requirements, wherein the first partial portion is less than the computing resource requirement, comprise programmed instructions for identifying a first network resource from a set of network resources, each network resource of the set comprising a partial portion of a necessary computing resource requirement less than the computing resource requirement, wherein the first network resource comprises a greatest partial portion of the computing resource requirement among members of the set.

18. The computer system according to claim 15, wherein monitoring execution of the served application comprises monitoring execution according a check max roll analysis of the served application.

19. The computer system according to claim 15, further the stored program instructions further comprising:
   programmed instructions for creating a deployment request for the checkpoint state, wherein the deployment request requires computing resources greater than the first partial portion of the computing resource.

20. The computer system according to claim 15, the stored program instructions further comprising:
   programmed instructions for completing the served application deployment request; and
   programmed instructions for notifying a user of the served application deployment request completion.

\* \* \* \* \*